United States Patent [19]

Miyagi

[11] Patent Number: 4,635,129
[45] Date of Patent: Jan. 6, 1987

[54] IMAGE SCANNING APPARATUS

[75] Inventor: Ken Miyagi, Yokohama, Japan

[73] Assignee: Canon Kabushiki Kaisha, Tokyo, Japan

[21] Appl. No.: 593,353

[22] Filed: Mar. 26, 1984

[30] Foreign Application Priority Data

Mar. 30, 1983 [JP] Japan ................................. 58-52744

[51] Int. Cl.⁴ .............................................. H04N 1/04
[52] U.S. Cl. ..................................... 358/285; 358/293
[58] Field of Search ............... 358/285, 293, 280, 294, 358/268, 213; 250/578; 382/44, 45

[56] References Cited

U.S. PATENT DOCUMENTS 4,325,086 4/1982 Sato et al. ........................... 358/294

Primary Examiner—James J. Groody
Assistant Examiner—Edward L. Coles
Attorney, Agent, or Firm—Fitzpatrick, Cella, Harper & Scinto

[57] ABSTRACT

An image scanning apparatus comprises a scanner for scanning an original sheet, a measuring section for measuring a time required for the scanner to move from a first position, e.g. a home position of the scanner, to a second position, e.g. a leading edge position of a record paper, and a timing circuit for determining a start timing of a scan of the scanner in accordance with the time measured by the measuring section.

15 Claims, 12 Drawing Figures

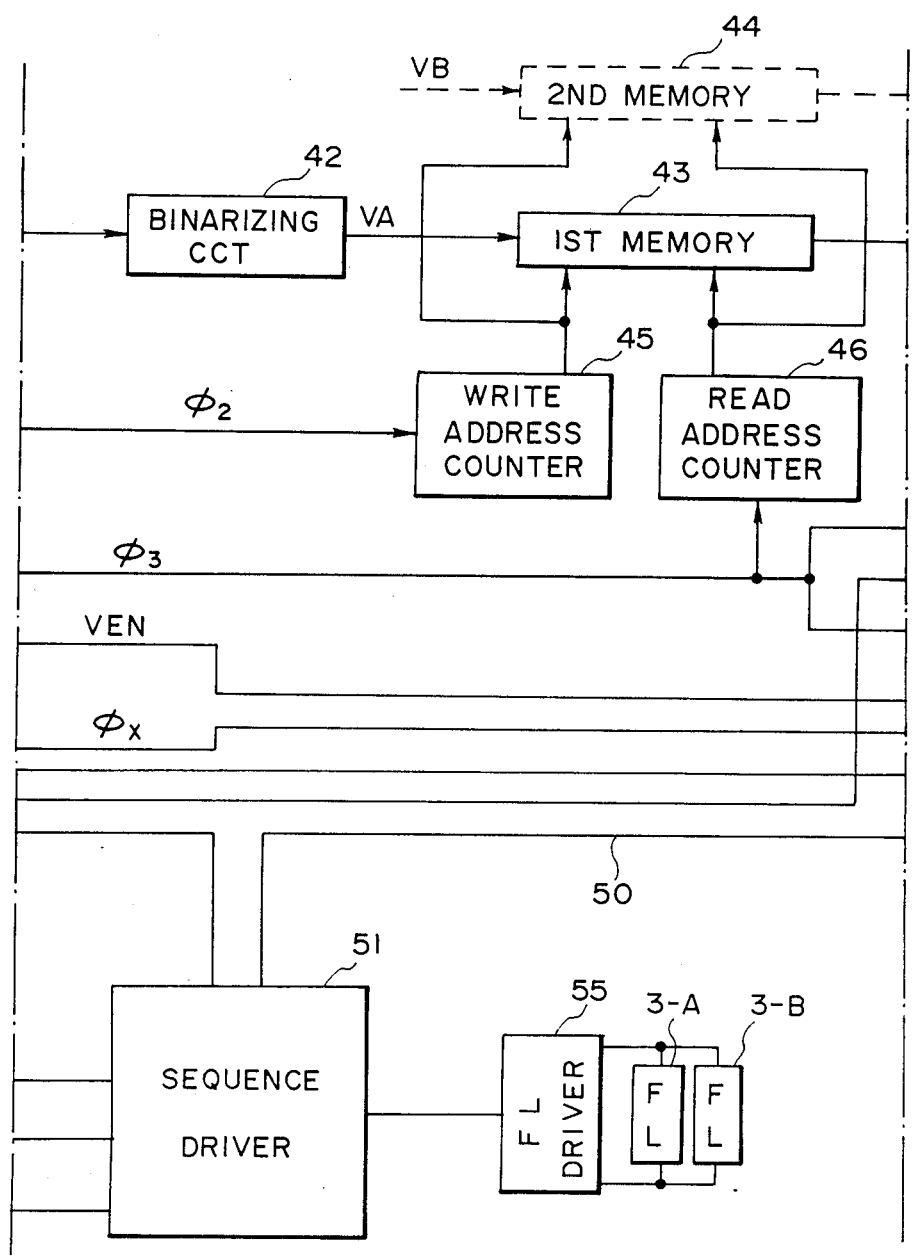
F I G. 2B

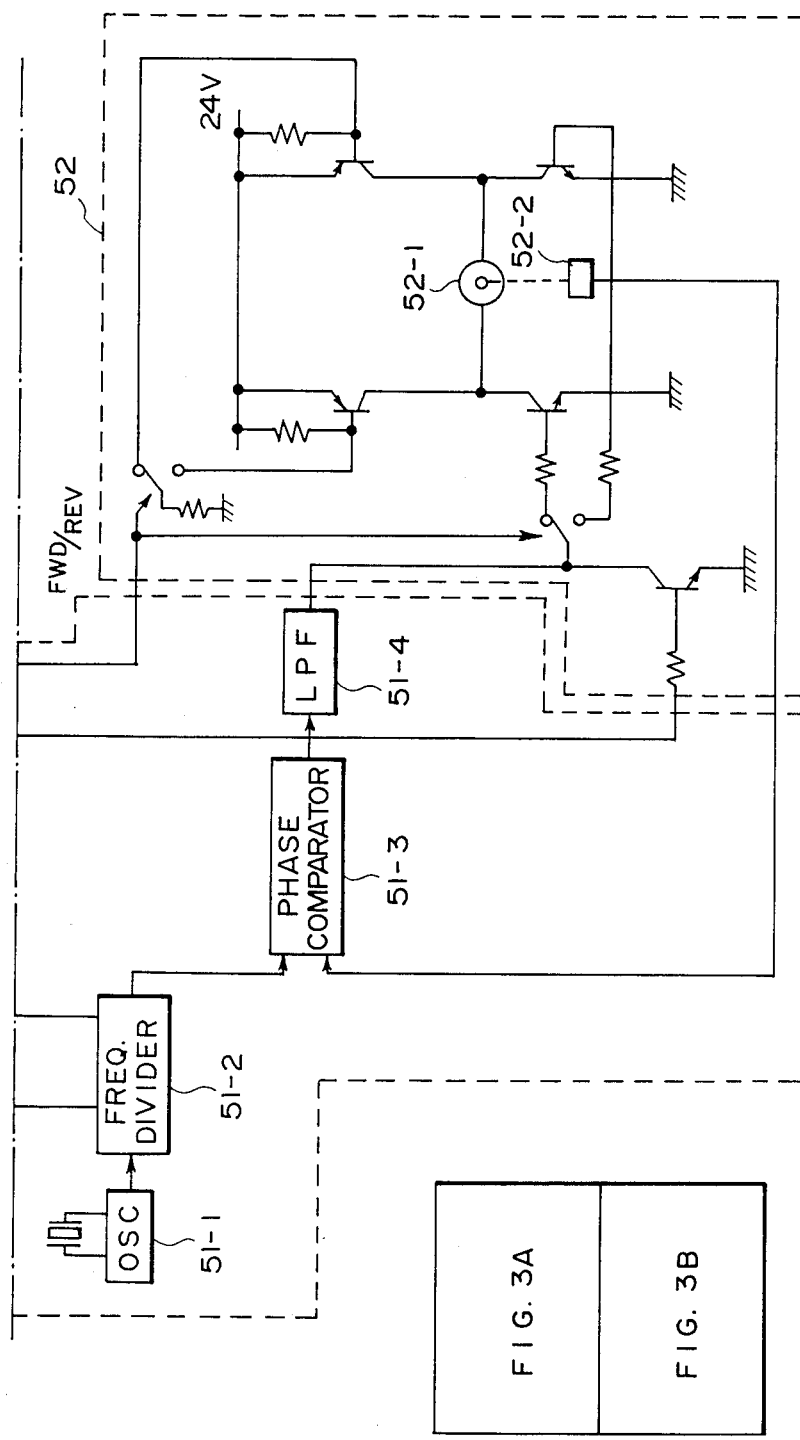

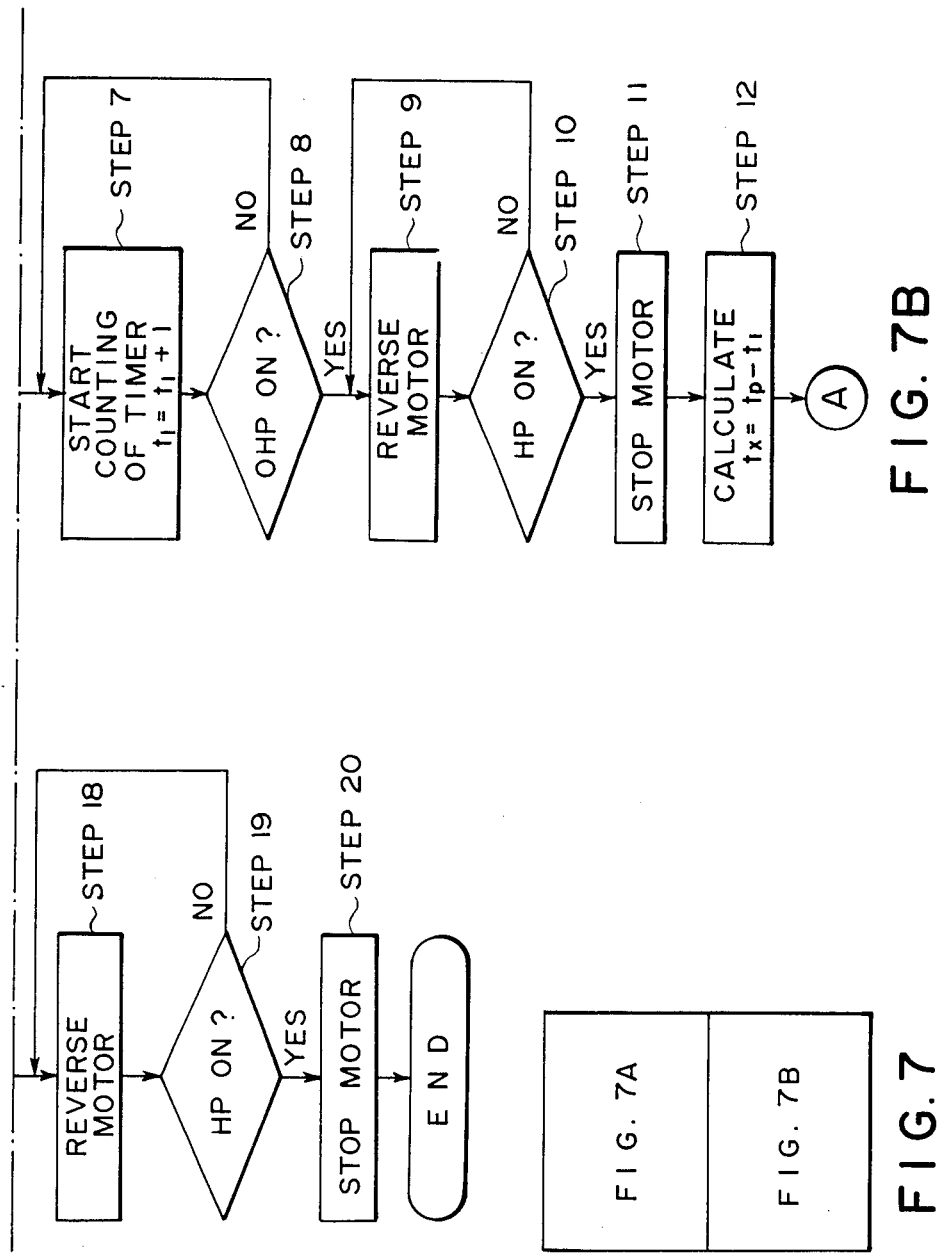

4,635,129

IMAGE SCANNING APPARATUS

BACKGROUND OF THE INVENTION

1. Field of the Invention

The present invention relates to an image scanner used in a reader, a copying machine or the like.

2. Description of the Prior Art

In a prior art copying machine, an original sheet is illuminated by a light source such as a halogen lamp or a fluorescent lamp, light reflected thereby is condensed by a lens and focused on a photosensitive drum in the machine through a mirror. A latent image is formed on the photosensitive drum. Then, developer is applied to the photosensitive drum so that the developer is deposited in accordance with the latent image. Thus, the latent image is visualized. The image is then transferred to a plane paper so that the original document image is copied.

In such a copying machine, the light reflected by the original sheet must be directed to the photosensitive drum by the optical system such as a reflection mirror and a lens, or in a special case, an optical fiberscope.

Accordingly, in such a copying machine, magnification/reduction function, moving function, etc., of the original document image are attained by mechanical means.

For example, a desired magnification factor in the magnification/reduction operation is achieved by moving the lens to change a focal distance of the lens and changing a scan speed of the original sheet or a speed of the movement of the photosensitive drum.

When it is desired to transfer a portion of the original sheet image to a selected position on a copy paper, the image formation position on the copy paper is not adjustable because it is fixed by mechanical factors. Thus, a user first determines the portion of the original sheet to be copied and must position that portion on an area on an original sheet mount which corresponds to the desired copy area of the copy paper. Such positioning is incorrect and inaccurate, and in certain instances, a test copy must be made to check the positioning.

SUMMARY OF THE INVENTION

It is an object of the present invention to eliminate the above-mentioned drawbacks.

It is another object of the present invention to provide an image scanner which can exactly transfer an original sheet image to a selected area on a record medium.

It is another object of the present invention to provide an image scanner which can precisely move a transfer position of an original sheet image irrespective of copy mode.

It is another object of the present invention to provide an image scanner having an improved image scan efficiency.

The other objects of the present invention will be apparent from the detailed description of the invention taken in conjunction with the accompanying drawings.

BRIEF DESCRIPTION OF THE DRAWINGS

FIGS. 3A-B show a circuit diagram of a sequence driver 51, FIGS. 7A-B show a control flow chart for the movement of the original sheet.

DETAILED DESCRIPTION OF THE PREFERRED EMBODIMENTS

Figure 1:
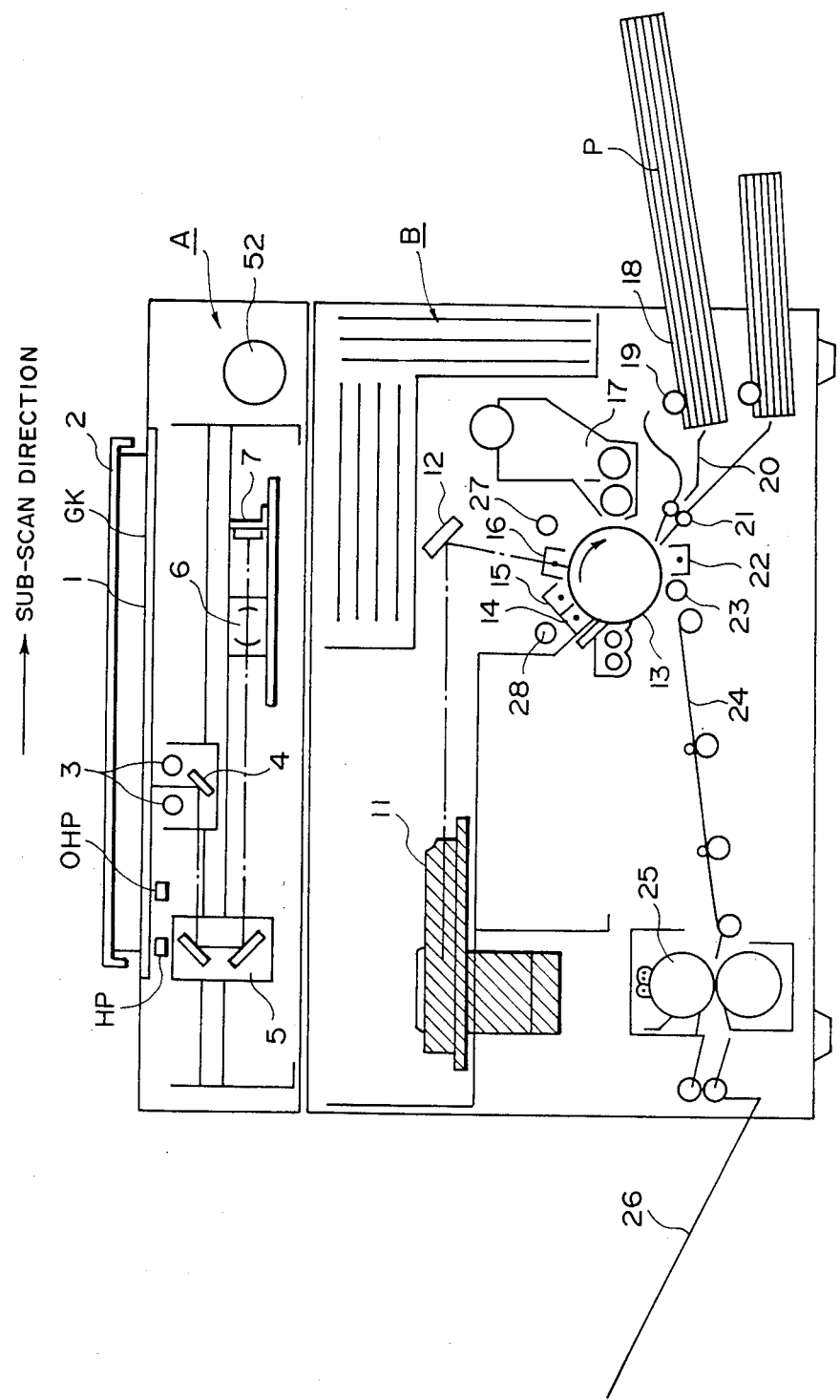
FIG. 1 shows an overall construction of a copying machine to which the present invention is applicable.

FIG. 1 shows one embodiment of a copying machine of the present invention. The present copying machine comprises an image reader A and a printer B constructed in union. These may be used as independent units. The units A and B have no mechanical connection and they are merely connected electrically.

Referring to FIG. 1, the reader A is first explained. Numeral 1 denotes an original sheet mount on which an original sheet GK is mounted. A reference mount position is at the left internal inside portion as viewed from the front. Numeral 2 denotes an original sheet cover for flatly and uniformly pressing the original sheet GK, and numeral 3 denotes a light source such as a fluorescent lamp for illuminating the original sheet GK. The lamp 3 is lit at the start of scan.

Light reflected by the original sheet 3 is directed to a lens system 6 through a reflection mirror 4 and a mirror unit 5 and focused on a photosensitive plane of a photosensitive device 7 such as a CCD line sensor by the lens system 6. The reflection mirror 4 and the mirror unit 5 are moved at relative speeds of 2 to 1.

A scan unit comprising the light source 3, the reflection mirror 4 and the mirror unit 5 is driven by a DC servo motor 52 which is PLL (phase locked loop) controlled so that it is moved at a constant velocity from left to right as viewed in FIG. 1 to sub-scan the original sheet GK. The velocity is, for example, 180 mm/sec, and the scan unit is returned from right to left at a velocity several times as high as that in the forward direction (left to right) in order to increase copying speed. A resolution power in the sub-scan direction may be 16 lines/mm and the sub-scan is continuously carried out. The width of the sub-scan may be as wide as size A3 (lateral orientation). In the present embodiment, a size A4 paper is oriented longitudinally and a size A3 paper is oriented laterally. Accordingly, the number of lines (resolution power) in the sub-scan direction is $210 \times 16 = 3360$ lines for the size A4, and $420 \times 16 = 6720$ lines for the size A3.

A sensor OHP which senses when a leading edge of the original sheet reaches the scan unit (3, 4, 5) is arranged on the left of the original sheet mount 1, and a sensor HP which senses a home position of the scan unit is arranged on the left of the sensor OHP. Accordingly, when the scan unit (3, 4, 5) reaches the leading edge of the original sheet, the light reflected by the original sheet is transmitted to the CCD line sensor 7 starting from an area of the original sheet corresponding to the sensor OHP for a time period corresponding to the width of the original sheet, and the light is photoelectrically converted. A main scan direction is orthogonal to the sub-scan direction, that is, longitudinal direction of the original sheet GK. In the present apparatus, the original sheet is electrically main-scanned by the CCD line sensor. In the main scan direction, a longitudinal side of the size A4 paper, at maximum, can be read. When a resolution power in the main scan direction is 16 lines/mm, the resolution for the size A4 paper is $297 \times 16 = 4752$ bits. In the present embodiment, two CCD sensors are used to attain the resolution of 2628 bits×2=5256 bits.

The printer B is now explained. In the embodiment, the printer B is a laser beam printer which uses an electrostatic process. A bit-serial image signal processed by the reader A is supplied to the printer B. The printer B includes a scanning optical unit 11 which comprises a laser driver, a semiconductor laser, a collimeter lens, a rotating polygon mirror, an F-θ lens and a correction optical system. The image signal is applied to the laser driver of the scanning optical unit 11. The laser driver drives the semiconductor laser in accordance with the image signal to produce a light modulated by "0" and "1" bits of the image signal. The modulated light is directed to the rotating polygon mirror of the scanning optical unit 11 so that the main scan is effected as the polygon mirror rotates. The scanned output light is directed to the reflection mirror 12 through the F-θ lens and the correction optical system of the scanning optical unit 11 so that it is directed to a selected position on the photosensitive drum 13 by the reflection mirror 12 to main-scan the photosensitive plane of the photosensitive drum 13.

The photosensitive drum 13 is rotated at a constant speed in the direction of the arrow so that an image is formed on the photosensitive plane in the sub-scan direction.

The photosensitive drum 13 may comprise three layers, a conductive layer, a photosensitive layer and an insulative layer. A process component for forming the image is arranged. Numeral 14 denotes a pre-discharger, numeral 28 denotes a pre-exposure lamp, numeral 15 denotes a primary charger, numeral 16 denotes a secondary charger, numeral 27 denotes a flat exposure lamp, numeral 17 denotes a developing unit, numeral 18 denotes a paper cassette, numeral 19 denotes a paper feed roller, numeral 20 denotes a paper feed guide, numeral 21 denotes a registration roller, numeral 22 denotes a transfer charger, numeral 23 denotes a separation roller, numeral 24 denotes a convey guide, numeral 25 denotes a fixing unit and numeral 26 denotes a tray.

The areas irradiated by the beam bear "black" pixel information and they are made latent by the high voltage chargers 14, 15 and 16 arranged around the photosensitive drum 13 and visualized when toner is deposited by the developing unit 17.

When a copy paper P is loaded in the paper cassette 18, it is conveyed to a vicinity of the photosensitive drum 13 by the paper feed roller 19 through the paper feed guide 20. When a registration clutch (not shown) is energized, the registration roller 21 is driven so that the copy paper P passes under the photosensitive drum 13 at a constant speed. The image visualized by the toner is transferred to the copy paper P by the transfer high voltage applied by the transfer charger 22, and the copy paper P having the toner image thereon is fed to the convey guide 24 through the separation roller 23. In this manner, the image signal from the original sheet GK is transferred to the copy paper P. Since the toner is merely deposited on the copy paper P at this stage, the copy paper P is fed from the convey guide 24 to the fixing unit 25 where the toner image is fixed by a high temperature and a high voltage to form a permanent image. The copy paper P is then ejected to the tray 26.

Figure 2C:
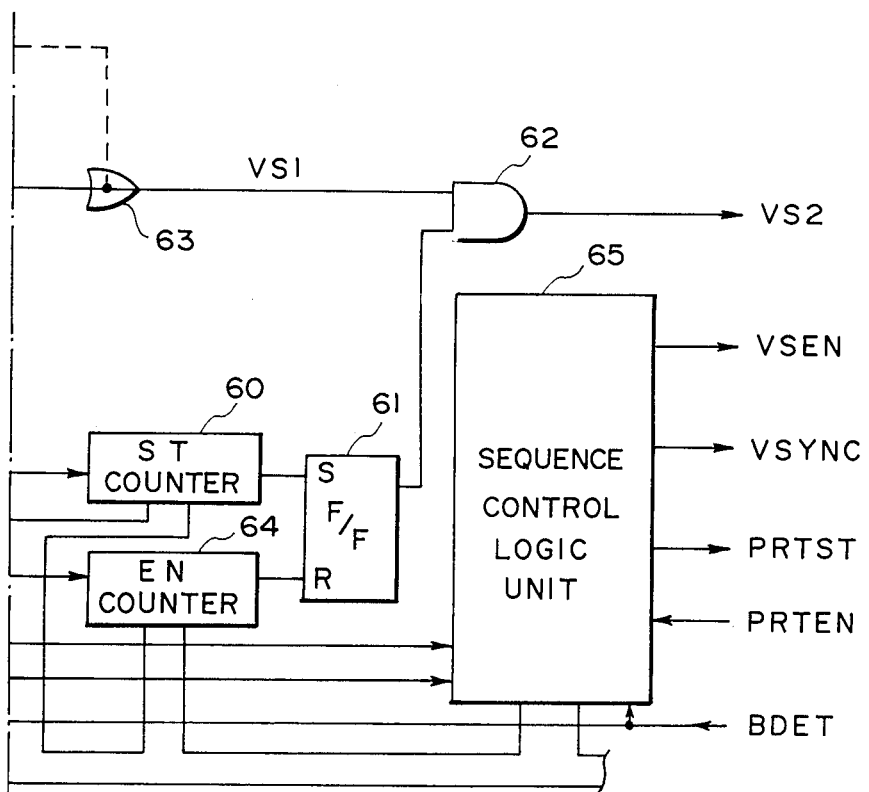
FIGS. 2A-C show an electrical circuit of a reader.
Figure 2:
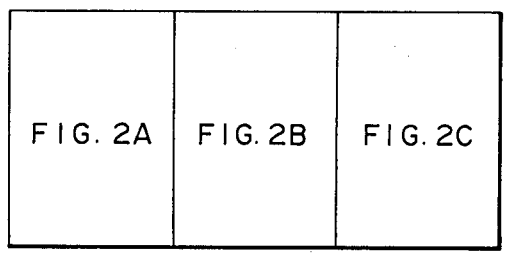
Figure 2A:
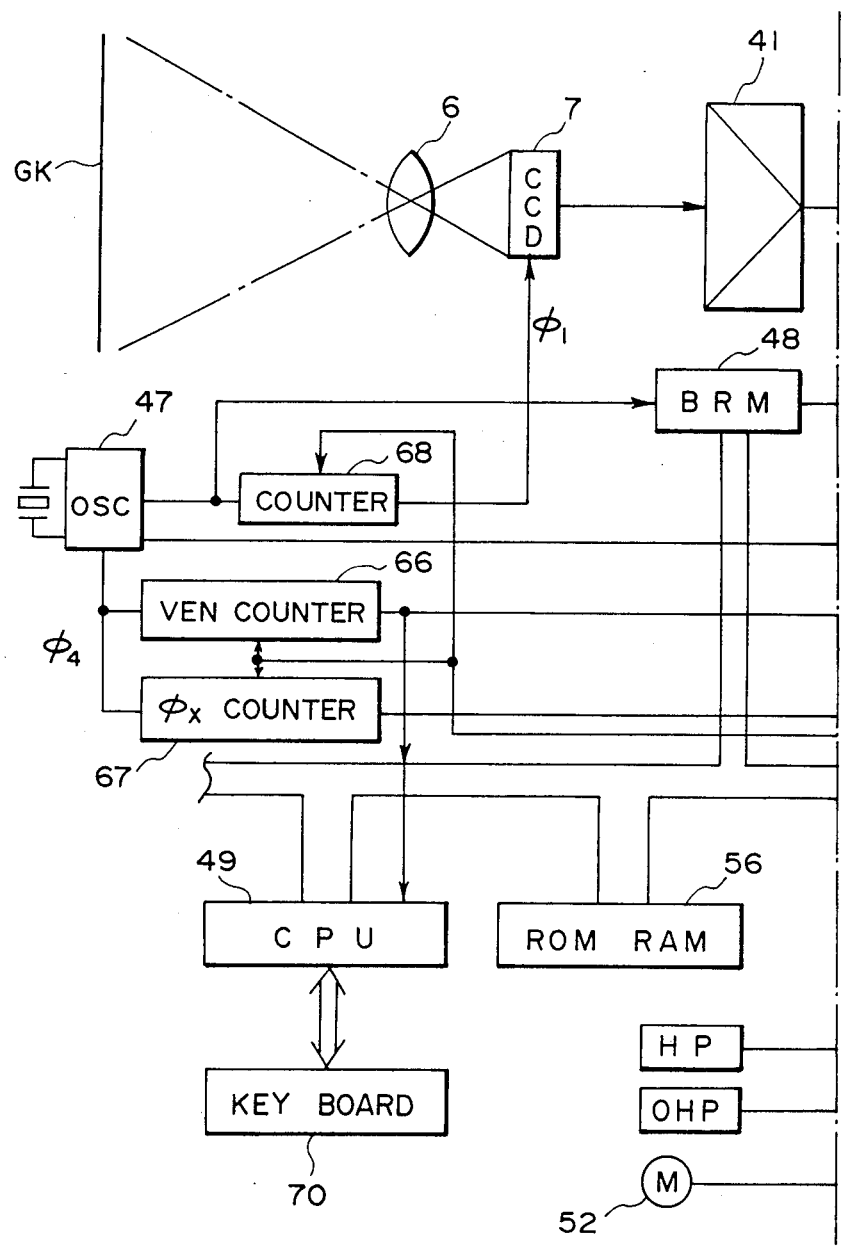

An electrical circuit of the reader A shown in FIG. 1 is shown in FIG. 2.

The light reflected by the original sheet and focused on the CCD line sensor 7 is converted to an image signal. A basic clock or a transfer clock signal $\phi_1$ is applied to the CCD line sensor 7 so that the image signal is serially read at a predetermined speed. Since the output signal from the CCD line sensor is of low level, it is amplified by a video amplifier 41 and then applied to a binarizing circuit 42, which quantizes the analog video signal into a digital signal. While not shown, a dither processing may be carried out for a photographic original image to attain a half-tone image. The digitized first video signal VA is stored in a first memory 43.

As described above, the present embodiment uses two CCD sensors 7. Accordingly, another channel of the optical system 6, the video amplifier 41 and the binarizing circuit 42 should be provided, although it is not shown, to avoid duplication. The second video signal VB of the second channel is stored in a second memory 44, indicated in phantom. The memories 43 and 44 may be a front memory and a back memory. Four memory blocks in total are provided.

Because of an upper limit on the frequency of the transfer clock $\phi_1$ for the CCD sensor, the two CCD sensors are used in the present embodiment to convert the light signal to the image signal at a high rate. The signals are written into the front memories by a write address counter 45 while the contents of the back memories previously stored are read out by a read address counter 46 to achieve the high speed operation.

The count rate of the write address counter 45 is determined by a clock signal $\phi_2$, which is derived by frequency-dividing an oscillation output of a crystal oscillator 47 by a binary rate multiplier (BRM) 48. The BRM 48 frequency-divides the input signal by an externally set frequency division ratio. A set input thereof is connected to a bus 50 of a microcomputer (CPU) 49.

By changing the period of the clock signal $\phi_2$, the magnification/reduction factor in the main scan direction can be changed. By changing the clock $\phi_2$ between $\phi_1/2$, $\phi_1$, $2\phi_1$, the reduction, equal scale and magnification copying are attained, because the sampling period to write the first and second video signals into the memories 43 and 44, respectively, change. In this manner, the magnification/reduction in the main scan direction is readily attained.

The period of a read clock signal $\phi_3$ which determines the read period of the read address counter 46 for reading the memories 43 and 44 is always constant. The clock signal $\phi_3$ is produced by the oscillator 47.

By changing a rotating speed of a sub-scan DC motor 52 by a sequence driver 51, a reduction mode is attained when the rotating speed of the motor 52 is high and a magnification mode is attained when the rotating speed is low. The rotating speed of the motor 52 is PLL controlled, and the sequence driver 51 is connected to the bus 50 of the microcomputer 49 to set the speed.

The sequence driver 51 further controls a driver 55 for the fluorescent lamps 3A and 3B which emit lights to illuminate the original sheet during a required period of the scan, and receives the outputs of the home position sensor HP which senses the home position of the scan unit and the original sheet leading edge sensor OHP.

The microcomputer 49 instructs the image processing operation, controls the sequence, calculates the magnification/reduction ratio, processes the protocol to the printer, controls the bus 50 and so on.

Numeral 56 denotes a memory including a ROM and a RAM. The ROM contains a program for sequentially operating the circuits. The RAM temporarily stores the data in the course of the operation.

Numeral 60 denotes a start bit counter which counts the read clock signal $\phi_3$ when the count reaches a value corresponding to a start position to write the image in the main scan direction, the counter 60 sends a set signal to a flip-flop 61, which sends a main scan direction write position designation signal HC to an AND gate 62. A video signal VS1 derived by combining the video outputs read from the first and second memories 43 and 44 by an OR gate 63 is applied to the AND gate 62, and a timing to read the video signal VS1 as a video signal VS2 is determined by the signal HC. The read clock signal $\phi_3$ is also supplied to an end bit counter 64, and when the count thereof reaches a value corresponding to the end position to read the image, the counter 64 sends a reset signal to a flip-flop 61 to terminate the read position designation signal HC. The bit counts representing the start and end positions to read in the main scan direction can be set in the counters 60 and 64, respectively, by the CPU 49 through the bus 50. In other words, only the video signal VS1 in the main scan direction designated by the CPU 49 is selected as the video signal VS2 and transferred to the printer B.

The counters 60 and 64 are reset whenever a beam detect signal BDET (to be described later) is applied.

Numeral 65 denotes a sequence control logic for synchronizing with the printer B under the control of the CPU 49, numeral 66 denotes a VEN counter and numeral 67 denotes a $\phi_x$ counter.

The VEN counter 66 is used to detect an effective image portion in the CCD image signal. It counts a clock $\phi_4$ corresponding to the transfer clock $\phi_1$ to detect the effective portion of the serial image signal from the CCD sensor 7. The output VEN from the VEN counter 66 is supplied to an interruption terminal of the CPU 49 to interrupt it at a rise or fall timing of the output VEN.

In the printer B, a start point of the main scan in the laser beam scan by the rotating polygon mirror is detected by a beam detector (not shown) and the beam detect signal BDET is supplied to the sequence control logic 65 and the counters so that, in the reader A, the start position of the main scan of the read image is matched to the start position of the main scan in the printer B. The counters are, therefore, reset by the beam detect signal BDET.

The $\phi_x$ counter 67 counts the clock signal $\phi_4$ which is derived by frequency-dividing the output of the oscillator 47 when the beam detect signal BDET is not supplied from the printer B, to produce a main scan synchronization signal $\phi_x$ of its own. When the beam detect signal BDET is supplied from the printer B, the $\phi_x$ counter 67 is not necessary, but when the beam detect signal BDET is not supplied from the printer B, the VEN counter 66 and the counter 68 which frequency-divides the output of the oscillator 47 to produce the transfer clock signal $\phi_1$ are reset by the synchronization signal $\phi_x$ so that the main scan for a pre-scan is effected in the reader A.

The output VEN of the VEN counter 66, the output $\phi_x$ of the $\phi_x$ counter 67 and the beam detect signal BDET are supplied to the sequence control logic 65, which generates a video enable signal VSEN, a vertical synchronization signal VSYNC and a print start signal PRTST.

The video enable signal VSEN indicates an effective image portion in one line of serial image signal.

The vertical synchronization signal VSYNC indicates a leading edge in the sub-scan direction. It is used to inform the leading edge of the read image to the printer B to allow copying of the original sheet image starting from the leading edge of the copy paper P. In the present apparatus, the signal VSYNC is used to drive the registration clutch (not shown).

The print start signal PRTST starts the preparation of the printer B for the copy operation. It instructs the drum rotation, the stabilization of the drum potential and the feed of the copy paper for the preparation for the image transfer.

The printer enable signal PRTEN which indicates the completion of the preparation of the printer B is supplied from the printer B to the sequence control logic 65.

In FIG. 2, a keyboard 70 has a copy start key and keys for setting a copy count, a magnification/reduction ratio, trimming and a paper size. The key inputs are stored in the RAM of the memory 56 through the bus 50 of the CPU 49. The content of the RAM is read by the instruction from the CPU 49 and transferred to the printer B through the bus 50.

Figure 3A:
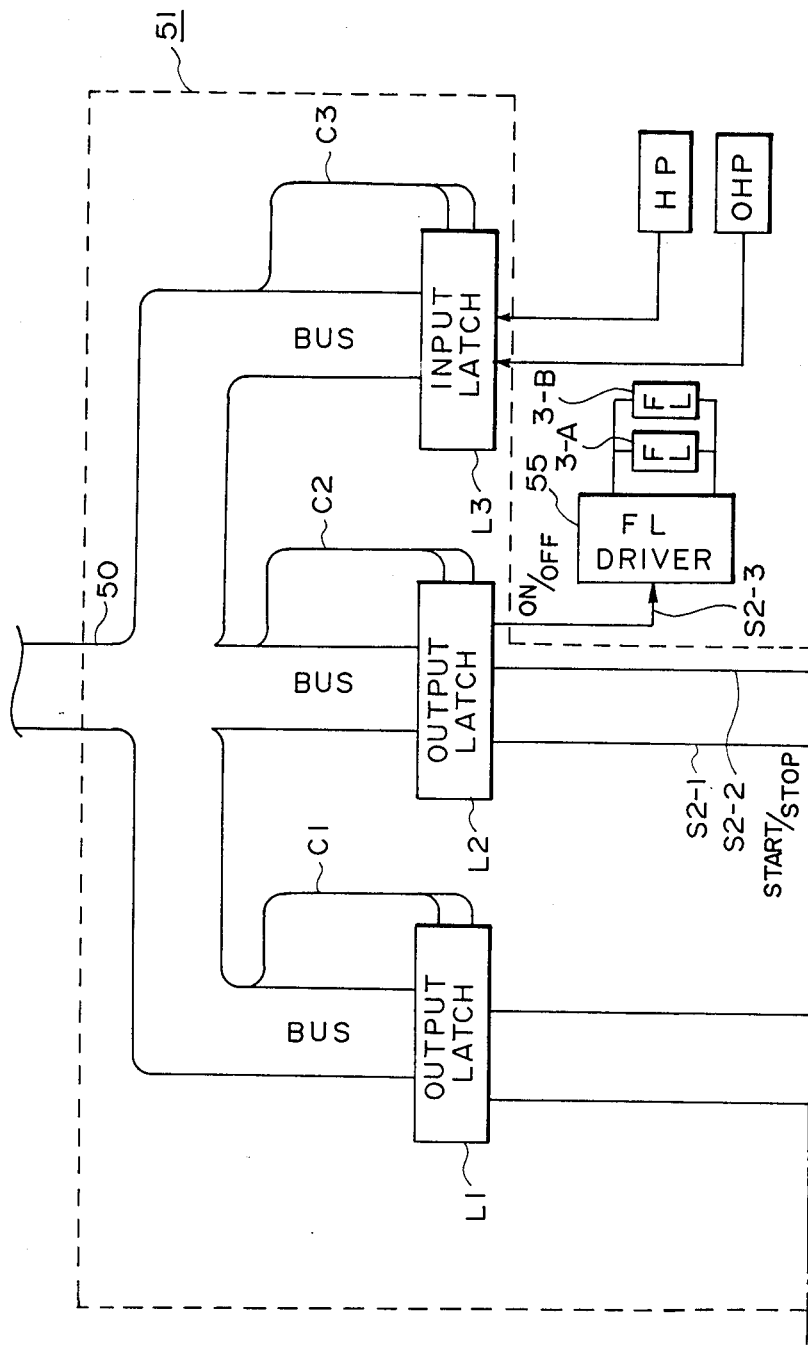

FIG. 3 shows a detail of the sequence driver 51. Input/output latch IC's L1, L2 and L3 are connected to the bus lines 50, and control lines C1, C2 and C3 are connected to the respective latches. The output latch L1 is used to change the rotating speed of the sub-scan DC motor 52. Numeral 51-1 denotes an oscillator which generates a pulse signal of a reference frequency. The output of the oscillator 51-1 is supplied to a frequency divider 51-2, which frequency-divides the input signal by a frequency-division ratio determined by the output of the output latch L1. A latch timing of the signal supplied to the output latch L1 through the bus 50 is determined by a latch signal from the control line C1.

Numeral 52-2 denotes an encoder which detects the rotating speed of the motor 52. The output of the encoder 52-2 is supplied to one input terminal of a phase comparator 51-3. The output of the frequency divider 51-2 is applied to the other input terminal of the phase comparator 51-3, which compares the phase of the input signals and produces a pulse signal in a manner to reduce a difference. This pulse signal is integrated by a low-pass filter 51-4 and converted to a DC signal, which is then applied to a driver for the motor 52.

Thus, by changing the frequency division ratio of the frequency divider 51-2, the rotating speed of the motor 52 can be changed. In the present embodiment, the osillator 51-1, the frequency divider 51-2, the phase comparator 51-3 and the low-pass filter 51-4 constitute a PLL control circuit.

The output latch L2 latches an ON/OFF signal S2-3 of a driver 55, a start/stop signal S2-1 of the motor 52, and a forward/reverse signal S2-2 of the motor 52. A latch timing is determined by a latch signal from the control line C2.

The input latch L3 latches the outputs of the sensors OHP and HP. A latch timing is determined by a latch signal from the control line C3.

The shifting of the image position in the present invention is explained with reference to FIG. 4. In the present apparatus, the image position is shifted by changing the scan timing of the reader A relative to the registration drive timing in the printer B.

Figure 4:
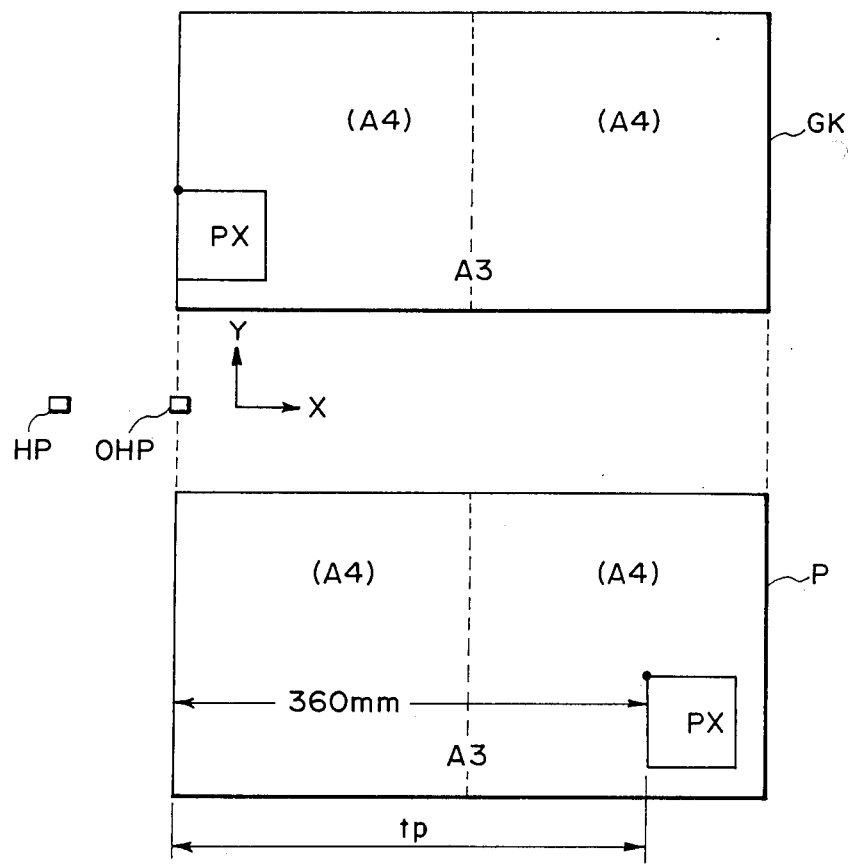
FIG. 4 illustrates movement of an original sheet.

In FIG. 4, a selected area PX on the original sheet GK is moved to a desired area on the copy paper P. In the present apparatus, if the registration clutch is driven when the scan unit comes to the position of the sensor OHP, the leading edge of the read image aligns with the leading edge of the copy paper so that the copy operation is carried out in a normal mode. Let us assume that the original sheet GK is of size A4 or A3, the selected area PX is on the left hand of the sheet, and an X-direction of the original sheet GK is the sub-scan direction and a Y-direction is the main scan direction. A reference point of the original sheet GK is at the left end which corresponds to the position of the image leading edge sensor OHP of the reader A.

The selected area PX is shifted to the desired area on the size A3 copy paper P, that is, shifted by 360 mm in the sub-scan direction in the illustrated example, and copied at the shifted position. When the magnification factor is unity and the sub-scan speeds in the reader A and the printer B are 180 mm/sec, a time required to move the image by the distance 360 mm is two seconds. Accordingly, if the scan unit starts the scan from the position of the sensor OHP two seconds after the registration clutch has been driven, the copy as shown in FIG. 4 is obtained. A time required for the scan unit to move between the sensors HP and OHP is represented by $t_1$.

Figure 5:
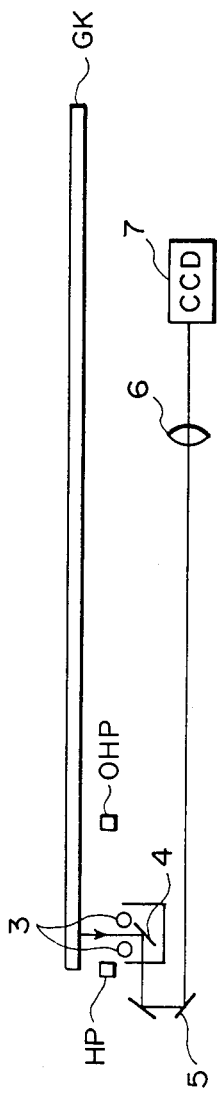
FIG. 5 shows a scanner of the reader.

The positional relationship of the sensors HP and OHP of the reader A is shown in FIG. 5. The scan unit starts to scan from the position of the sensor HP and reaches a predetermined speed during the movement of an acceleration distance corresponding to the time period $t_1$, before it reaches the position of the image leading edge sensor OHP. In the present embodiment, since the original sheet GK is sub-scanned at the speed of 180 mm/sec, the predetermined speed is equal to 180 mm/sec. However, since the speed between the sensor HP and to the sensor OHP changes from zero to the predetermined speed, the time from the sensor HP to the sensor OHP is not constant.

In a continuous copy mode, the stop position of the scan unit in the return scan is not constant due to variations in the mass of the scan unit and slip friction. When the image is to be shifted while it is magnified or reduced, the scan speed is changed in accordance with the magnification/reduction factor and hence the transit time from the sensor HP to the sensor OHP varies.

In the present invention, in order to exactly measure the transit time from the sensor HP to the sensor OHP, the original sheet is pre-scanned at the same speed as the actual copy speed and the transit time of the scan unit from the sensor HP to the sensor OHP is measured.

The scan time $t_1$ is determined by measuring the transit time. After the scan unit has passed the OHP, the scan unit is immediately stopped and returned to the position of the sensor HP, or the scan unit may not be stopped and may scan the original sheet.

In the example shown in FIG. 4, when the selected area PX is shifted, the start time of the scan unit of the reader A is shifted from the registration drive time of the printer B by a time equal to $t_p - t_1 = t_x$ so that the exact shifting of the image is attained.

The above operation is explained in detail with reference to a timing chart shown in FIG. 6.

A timing between the reader A and the printer B is first explained. The selected area PX of the original sheet GK shown in FIG. 4 is to be read, and it is located at the leading edge of the original sheet GK. Since the selected area PX is to be shifted to the trailing area on the copy paper P, the registration signal (VSYNC) is issued to the printer B to start the transfer. The reader A does not start the scan at this moment. The image signal is not produced and a white copy is made. As the photosensitive drum 13 is rotated and the copy paper P is further conveyed, the reader A issues the scan control signal through the bus 50 to start the conversion of the original image to the electrical signal. Thus, the video signal VS2 for the leading area of the original sheet is transferred to the printer B so that the shifted image of the selected area PX is formed. The scan control signal is the signal to drive the scan unit and corresponds to the signal S2-1 from the output latch L2 in FIG. 3.

Figure 6A:
FIGS. 6A and 6B show time charts for explaining the operations of the reader and a printer.

FIG. 6A shows the registration drive signal in the printer B, that is, the signal VSYNC. When the signal rises to become an active signal, the registration clutch is energized and the transfer operation is started. In the previous step, the photosensitive drum 13 has been rotated and the paper feed operation has been completed. Thus, the image signal is received and the transfer operation is immediately started.

Figure 6B:
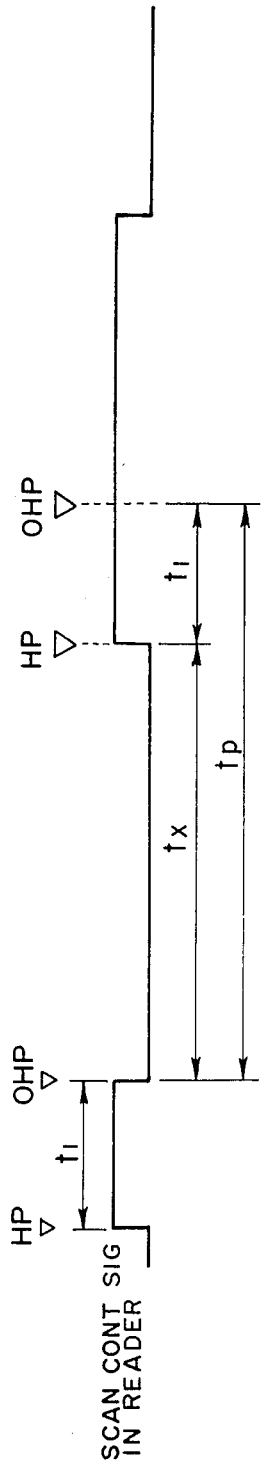

FIG. 6B shows the scan control signal in the reader A. The movement of the scan unit is illustrated together with the positions of the sensors HP and OHP.

The most important factor needed to shift the selected area PX of the original sheet to the area on the copy paper P which is 360 mm distant from the corresponding position in the sub-scan direction is the exact time $t_x$. To determine the time $t_x$, the time $t_p$ is determined by the scan speed and the shift position and it is two seconds in the present example, and the time $t_1$ can be exactly determined by measuring the transit time of the scan unit from the sensor HP to the sensor OHP prior to the reading of the original sheet. Thus, in the present apparatus, prior to the actual read scan of the original sheet, the scan unit is moved between the sensor HP and the sensor OHP at the same speed as the actual read scan speed and the time $t_1$ is measured. The signal VSYNC is issued to the printer B to start the transfer operation and start the feed of the copy paper P, and after the time $t_x$, the scan control signal in the reader A is rendered active to start the scan of the original image. In this manner, the selected area PX can be exactly shifted to the desired area on the copy paper P.

Figure 7A:
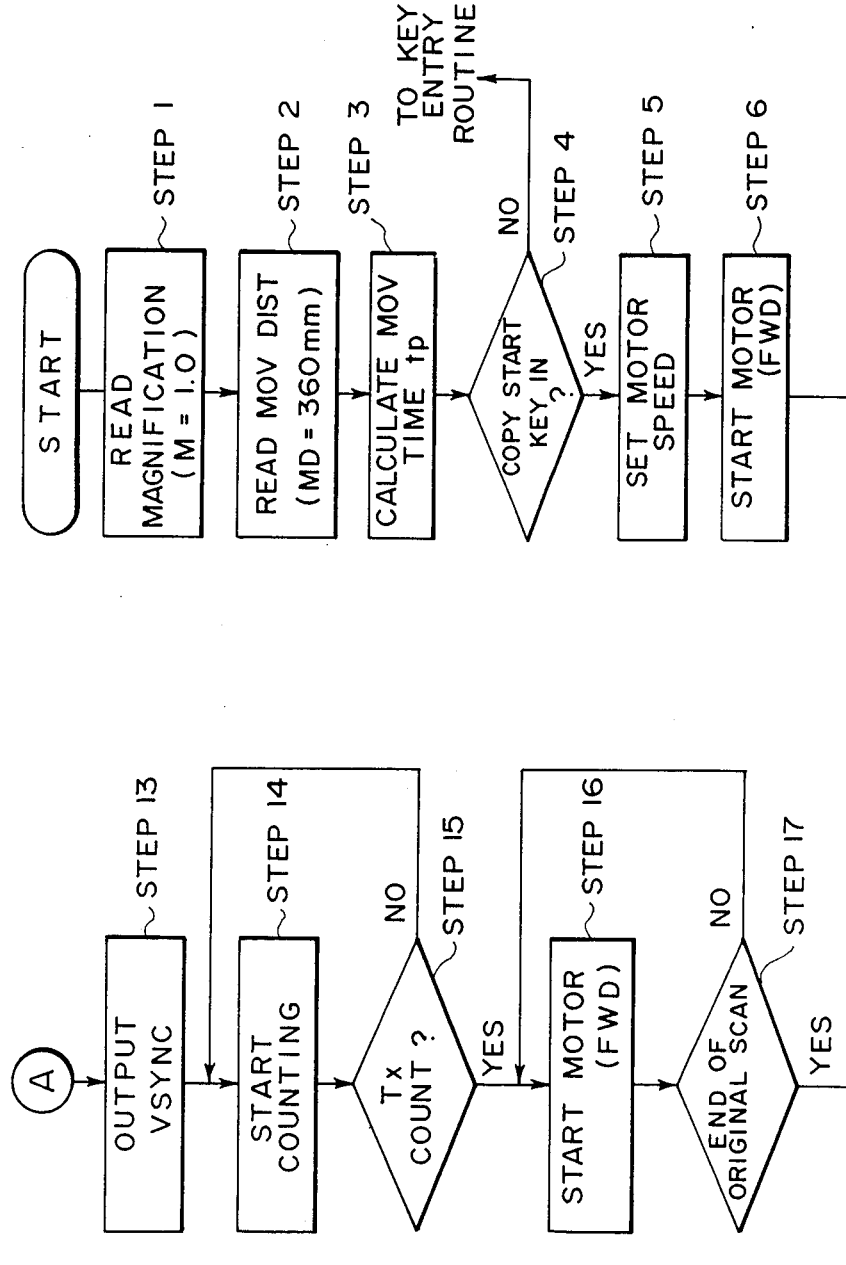

FIG. 7 shows a flow chart for shifting the image area. It is programmed and stored in the ROM of the memory 56. The flow chart of FIG. 7 is explained with reference to FIGS. 2 and 3. The CPU 49 reads in the magnification specified by the keyboard 70 and the shift distance of the image in the sub-scan direction (steps 1 and 2), and calculates the time $t_p$ corresponding to the shift distance (step 3). In the above example, since the magnification is 1.0 and the shift distance is 360 mm, the time $t_p$ is two seconds. In a step 4, the depression of the copy start key is checked. If it is depressed, a step 5 is executed to determine the output of the output latch L1 and the motor speed. Since the magnification is 1.0 in the above example, the motor speed is set such that the scan unit is moved at the speed of 180 mm/sec. In a step 6, the direction of rotation of the motor is set to forward by the output latch L2 and the motor is started to rotate.

In steps 7 and 8, the time $t_1$ required for the scan unit to reach the sensor OHP is counted by the internal timer. After the scan unit has reached the sensor OHP, the motor is reversely rotated by the output latch L2 in a step 9.

If a decision is made in a step that the scan unit has reached the sensor HP, the motor is stopped by the output latch L2 is a step 11 to terminate the pre-scan. In a step 12, the time $t_x = t_p - t_1$ is calculated to determine the scan start timing of the scan unit. In a step 13, an instruction is issued to the sequence control logic to produce the signal VSYNC, and in steps 14 and 15, the scan start time $t_x$ is counted by the internal timer. At the end of counting of the time $t_x$, a step 16 is executed to set the direction of rotation of the motor to forward by the output latch L2 and rotate the motor to start the read scan of the original sheet. In a step 17, if the scan of the original sheet is completed, the motor is rotated reversely in a step 18 to return the scan unit to the position of the sensor HP. When the scan unit reaches the sensor HP (step 19), the motor is stopped in a step 20 to terminate the read scan of the original sheet.

In the embodiment described above, the original image is converted to the digital signal before the copy operation. The present invention is equally applicable to a conventional analog processing copying machine so long as the registration timing is variable relative to the start timing of the scan of the original sheet. Thus, the same advantage is attained in shifting the image in the sub-scan direction in the analog processing copying machine.

In the above embodiment, when the selected area PX of the original sheet is to be shifted to the rear portion on the copy paper PX, the transit time $t_1$ of the scan unit from the sensor HP to the sensor OHP is measured prior to the reading of the original image in order to precisely determine the shift distance. It is effective when the selected area on the original sheet is to be shift behind the normal copy position in the sub-scan direction (X-direction in FIG. 4). When the selected area is to be shifted in the opposite direction, the shift distance may be determined based on the time required for the scan unit after it passed the sensor OHP. In this case, the time $t_1$ need not be measured.

In the above embodiment, the pre-scan is carried out prior to the read scan of the original sheet to measure the time $t_1$. However, if the motor has a rapid rise time or the scan unit has a high mechanical precision, the pre-scan is not always necessary for each read scan. For example, the pre-scans may be made for all copy modes (for example, all copy modes of different magnifications) when the apparatus is assembled in a factory and the times $t_1$ in the respective modes may be stored in the RAM. Thus, the copy efficiency can be improved.

The shifting of the image in the main scan direction is readily attained by changing the read time of the memories 43 and 44.

In the above embodiment, the scan start timing of the scan unit is changed in accordance with the time $t_1$ measured. Alternatively, the output timing of the signal VSYNC may be changed.

Thus, the timing control may be effected in such manner that while a time period from a preset reference time till scan start of the scan unit is fixed, a time period from the reference time till occurrence of the signal VSYNC is controlled in accordance with the time $t_1$ mentioned above.

As described hereinabove, according to the present invention, when a portion of the original image is to be shifted in the sub-scan direction and copied at a rear portion on the copy paper, the transit time of the scan unit from the sensor HP to the sensor OHP is measured so that the portion of the original image is precisely shifted to the desired position on the copy paper.

Since the pre-scan is effected prior to the copy operation, errors due to the variation of the rise time of the drive motor and the frictions of the mechanical rotating parts and sliding parts of the scan unit can be corrected and more precise shifting of the original image is attained.

The present invention is not limited to the illustrated embodiment but many modifications and variations may be made within the scope of the appended claims.

What I claim is:

1. An image scanning apparatus comprising:
   scan means for scanning an original sheet; measuring means for measuring a time required for said scan means to move from a first position to a second position; and
   timing means for determining a start timing of image processing in accordance with the time measured by said measuring means.

2. An image scanning apparatus according to claim 1, wherein said timing means determines the start timing of the scan by said scan means in accordance with the time measured by said measuring means.

3. An image scanning apparatus according to claim 1, further comprising record means capable of recording on a record medium at a different timing from the scan timing of said scan means.

4. An image scanning apparatus according to claim 3, wherein said timing means determines a start timing of a record operation of said record means in accordance with the time measured by said measuring means.

5. An image scanning apparatus according to claim 2, further comprising record means capable of recording on a record medium at a different timing from the scan timing of said scan means, said timing means determining the start timing of the scan by said scan means based on the start timing of the record operation of said record means.

6. An image scanning apparatus according to claim 1, wherein said measuring means measures a time required for the scan means to move from the first position to the second position during a pre-scan operation of said scan means.

7. An image scanning apparatus according to claim 1, wherein said first position is a stop position of said scan means and said second position is a leading edge position of the original sheet.

8. An image scanning apparatus according to claim 5, wherein said timing means determines the start timing of the scan by said scan means in accordance with a shift distance of the image read by said scan means from the original sheet so that the image of the original sheet is shifted to a desired area on the record medium.

9. An image scanning apparatus according to claim 1, further comprising means for converting the image of the original sheet scanned by said scan means to an electrical signal.

10. An image forming apparatus comprising:
    scan means for scanning an original sheet;
    setting means for setting an image forming mode;
    pre-scan means for effecting pre-scan by said scan means; and
    timing means for determining a start timing of a scan by said scan means in accordance with the image forming mode set by said setting means and a result of said pre-scan.

11. An image forming apparatus according to claim 10, wherein said pre-scan means includes measuring means for measuring a time required for said scan means to move from a first position to a second position.

12. An image forming apparatus according to claim 11, wherein said timing means determines the start timing of the scan by said scan means in accordance with the time measured by said measuring means and the image forming mode set by said setting means.

13. An image forming apparatus according to claim 12, further comprising record means for recording the image of the original sheet read by said scan means on a record medium, said setting means being capable of setting a mode to shift the image of the original sheet to a desired area on the record medium.

14. An image forming apparatus according to claim 11, wherein said first position is a stop position of said scan means and said second position is a leading edge position of the original sheet.

15. An image forming apparatus according to claim 13, wherein said timing means determines the start timing of the scan of said scan means based on the start timing of the record operation of said record means.

* * * * *